United States Patent [19]

Bosman

[11] Patent Number: 4,762,650
[45] Date of Patent: Aug. 9, 1988

[54] PACKING ELEMENTS FOR EVAPORATIVE COOLERS AND A METHOD OF SUPPORTING PACKING ELEMENTS IN COOLING TOWERS

[75] Inventor: Peter B. Bosman, Sandton, South Africa

[73] Assignee: WLPU Holdings Proprietary Limited, Transvaal, South Africa

[21] Appl. No.: 18,339

[22] Filed: Feb. 24, 1987

[30] Foreign Application Priority Data

Feb. 25, 1986 [ZA] South Africa .................. 86/1411

[51] Int. Cl.⁴ .................................................. B01F 3/04
[52] U.S. Cl. .................................... 261/100; 261/106; 261/DIG. 72; 261/DIG. 11
[58] Field of Search ............... 261/DIG. 11, DIG. 72, 261/100, 106

[56] References Cited

U.S. PATENT DOCUMENTS

| | | | |
|---|---|---|---|
| 494,292 | 3/1893 | Dornfeld | 261/106 |
| 2,092,630 | 9/1937 | Bailey | 261/106 |
| 2,112,041 | 3/1938 | Miller | 261/106 |
| 2,271,671 | 2/1942 | Wible | 261/DIG. 72 |
| 2,470,652 | 5/1949 | Scofield | 261/95 |
| 2,490,080 | 12/1949 | Melvill | 261/DIG. 11 |
| 2,630,305 | 3/1953 | Scofield et al. | 261/DIG. 72 |
| 2,808,243 | 10/1957 | Slough et al. | 261/DIG. 11 |
| 3,010,706 | 11/1961 | McWilliams | 261/DIG. 72 |
| 3,031,173 | 4/1962 | Kohl et al. | 261/DIG. 11 |
| 3,189,335 | 6/1965 | Fuller et al. | 261/DIG. 11 |
| 3,346,246 | 10/1967 | Loetel et al. | 261/DIG. 11 |
| 3,363,531 | 1/1968 | Kohlmeyer et al. | 261/106 |
| 3,389,895 | 6/1968 | DeFlon | 261/DIG. 11 |
| 3,516,647 | 6/1970 | Jaffe et al. | 261/100 |
| 3,540,702 | 11/1970 | Uyama | 261/112 |
| 3,643,931 | 2/1972 | Henning et al. | 261/DIG. 11 |
| 3,751,017 | 8/1973 | Lemmens | 261/DIG. 11 |
| 3,782,703 | 1/1974 | Kolar | 261/112 |
| 3,890,143 | 6/1975 | Skeglund et al. | 75/125 |
| 4,052,491 | 10/1977 | Lefevre | 261/DIG. 11 |
| 4,181,692 | 1/1980 | Stone | 261/DIG. 11 |
| 4,294,659 | 10/1981 | Campbell | 165/33 |
| 4,338,266 | 7/1982 | Flower | 261/106 |
| 4,562,015 | 12/1985 | Lefevre | 261/94 |

FOREIGN PATENT DOCUMENTS

| | | | |
|---|---|---|---|
| 869527 | 2/1942 | France | 261/106 |
| 2027505 | 10/1970 | France | |
| 2061127 | 5/1981 | United Kingdom | |

*Primary Examiner*—Tim Miles
*Attorney, Agent, or Firm*—Harness, Dickey & Pierce

[57] ABSTRACT

A packing element 70, 94, 112 for an evaporative cooler, which comprises an apertured, corrosion resistant structure which includes a sheet of expanded metal. The metal is preferably of a ferritic corrosion resistant material such as 3Cr12. The invention also provides for a method of packing an evaporative cooler which includes using, in a single packing 68 for an evaporative cooler, packing elements 94 having a configuration suited to cross-flow conditons and, in addition, packing elements 70 having a configuration suited to counter-flow conditions. The invention provides further for a method of supporting a packing 68 having a trickle pack configuration, in a wet cooling tower 40.

7 Claims, 6 Drawing Sheets

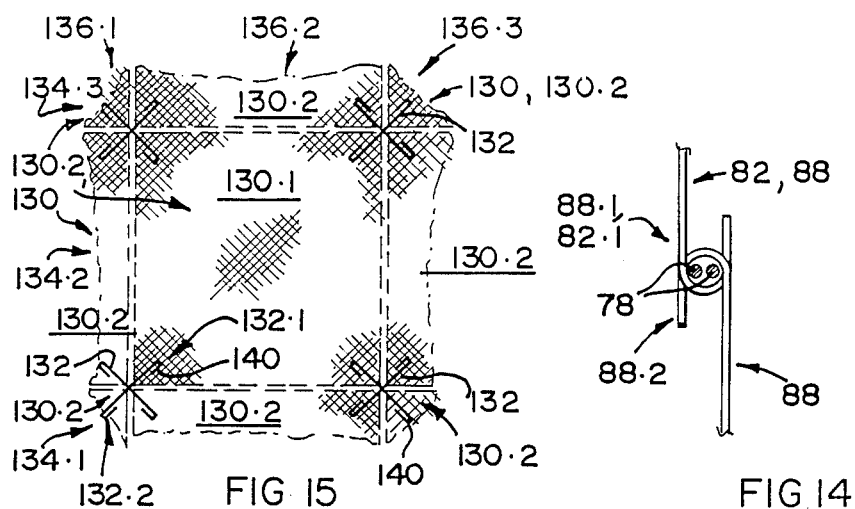
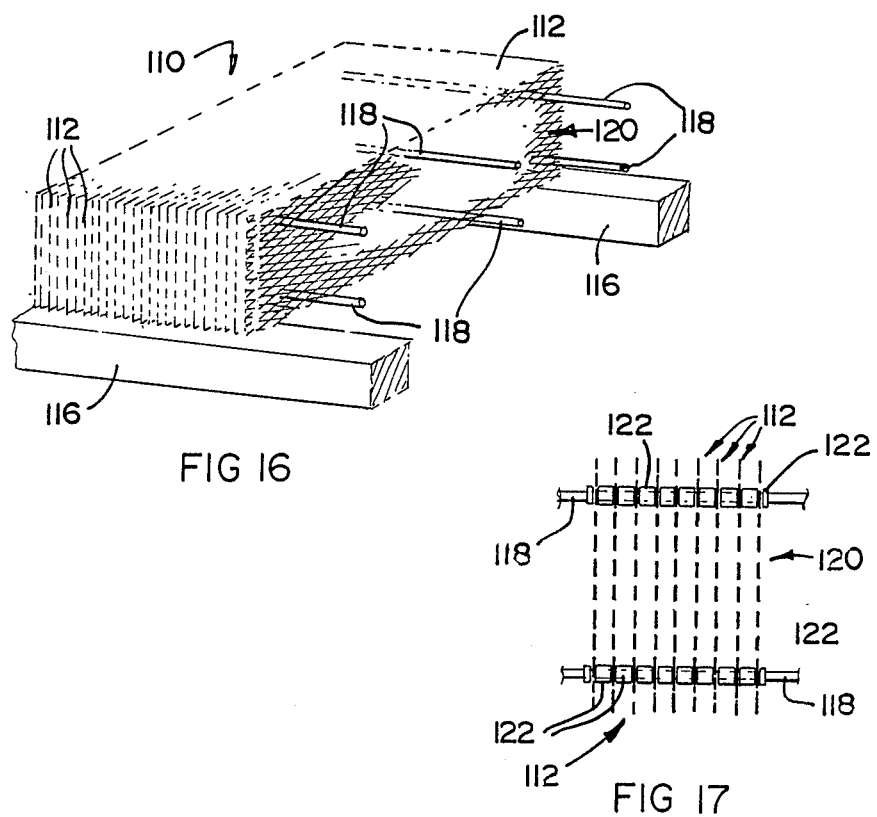

PACKING ELEMENTS FOR EVAPORATIVE COOLERS AND A METHOD OF SUPPORTING PACKING ELEMENTS IN COOLING TOWERS

This invention relates to evaporative coolers and in particular to packings for evaporative coolers. Evaporative coolers may be used for cooling a gas such as air using a liquid such as water as a coolant, or for cooling a liquid using gas as a coolant, and/or for humidifying the gas.

Induced and natural draught wet cooling towers are examples of an evaporative cooler to which this invention relates, for cooling water using air as the coolant, and the present invention relates particularly to cooling towers and more particularly to packings therefor. However, it should be understood that wherever the invention is described with respect to cooling towers only, it is not the Applicant's intention that the invention, insofar as it relates to evaporative coolers per se or to packings therefore, be limited to cooling towers.

Yet further, the invention relates to a method for installing packings according to the invention in evaporative coolers.

The Applicant is aware of different types of packings for wet cooling towers and evaporative coolers which work on the same principles as the cooling towers. These include packings known to the Applicant as "film packs", "trickle packs" and "splash packs" respectively. In the wet cooling towers the film packs and trickle packs provide an increased surface area over which the water can flow, thereby increasing the exposed surface area of the water to promote its cooling, whereas the splash packs provide impact surfaces for the water which, on impact with these surfaces breaks into relatively small droplets, thereby increasing the exposed surface area of the water to promote its cooling.

According to the invention there is provided a packing element for an evaporative cooler which comprises an apertured, corrosion resistant structure which includes an expanded metal sheet.

Whenever the term "expanded metal" is used herein, it should be understood to mean a metal network formed by suitably stamping or cutting sheet metal and stretching it to form an open mesh.

The expanded metal sheet which may be of a chromium-containing ferritic corrosion-resistant steel, for example the steel known in the trade as "3Cr12" which contains a nominal 12% m/m chromium and which is produced by Middelburg Steel and Alloys (Proprietary) Limited. Instead, the metal sheet may be of conventional stainless steel, aluminum, copper or brass.

Heretofore, packing elements have been manufactured from non-metallic materials with a relatively low thermal conductivity. Significant heat exchange in evaporative coolers has therefore taken place only directly between the gas and the liquid. However, the thermal conductivity of metal in general, and of the 3Cr12 from which a preferred packing element of the invention is manufactured, provides for heat exchange not only between the gas and the liquid directly but also between the relatively hot medium (either the gas or the liquid) and the metal of the packing elements and subsequently, between the heated metal and the coolant medium. Thus, the hot medium which can transfer heat simultaneously to the coolant medium and to the metal, cools more rapidly.

Alternatively, the metal may not itself be resistant to corrosion, and then the metal sheet may be provided with an epoxy coating or may be coated with another corrosion-resistant material which may be a synthetic plastics material, in order to render the structure corrosion-resistant.

The apertures of the metal sheet may be elongate, and in a preferred embodiment of the invention, the apertures are substantially rhombic in shape. Such a packing element may have apertures with width and length dimensions of from approximately 5 mm and 8 mm respectively, to approximately 60 mm and 120 mm respectively. The apertures may be separated from one another by inter-aperture structural strips having a width dimension between approximately 2 mm and 10 mm.

The size of the apertures in the structure may be determined by its intended use. Where the structure is intended for use as or as part of a trickle pack, it will tend to have smaller apertures than those intended for use as or as part of a splash pack. Furthermore, the width dimensions of inter-aperture strips of the structure for a splash pack will be relatively great to provide effective impact surfaces.

Further, the void ratio and size of the apertures of a splash pack will be dependent upon whether the splash pack is intended for use in a cross-flow environment in which the gas flows in a substantially horizontal direction and in a plane substantially parallel to the respective planes occupied by the packing elements constituting the pack, and transverse to the direction of flow of the liquid, or for use in a counter-flow environment in which the gas flows in a direction substantially transverse to the respective planes occupied by the packing elements and opposed to the direction of flow of the liquid. In a cross-flow environment, the size of the apertures of the packing elements needs to be sufficient to permit the liquid to pass through them. However, in a counter-flow environment, the size of the apertures needs to be sufficient to permit the passage therethrough of the liquid against the pressure of the gas simultaneously being drawn upwardly through the apertures. For similar reasons, the void ratio of packing elements in a splash pack intended for use in cross-flow conditions is generally lower than that of packing elements in a splash pack intended for use under counter-flow conditions.

The configuration of the structure, and in particular the dimensions of the apertures, will also be dependent upon the nature of the particular liquid and the state of the liquid (e.g. its degree of cleanness) for which the evaporative cooler is being used. It will be appreciated, for example, that whereas a structure with relatively small apertures will be suitable for relatively clean water, a structure with relatively large apertures and relatively wide inter-aperture strips will better suit relatively dirty water with a high proportion of impurities.

The structure of a packing element according to the invention for particular use in a trickle pack may have a void ratio in the range from about 0.60 to about 0.90; apertures which are substantially uniform in size with width and length dimensions of from approximately 5 mm and 7 mm respectively, to approximately 10 mm and 25 mm respectively; and inter-aperture structural strips with a width dimension of between approximately 2 mm and 4 mm.

The structure of a packing element according to the invention for particular use in a splash pack may have a void ratio in the range from about 0.4 to about 0.95; apertures which are substantially uniform in size with width and length dimensions of from approximately 10 mm and 30 mm respectively, to approximately 60 mm and 120 mm respectively; and inter-aperture structural strips with a width dimension of between approximately 3 mm and 10 mm.

The invention extends to a packing for an evaporative cooler which includes a packing element according to the invention.

The packing may constitute a trickle pack which may include a plurality of substantially vertically disposed, horizontally spaced, packing elements according to the invention.

Instead, the packing may constitute a splash pack which may include a plurality of substantially horizontally disposed, vertically spaced, packing elements according to the invention, and the packing elements may be staggered so that their respective apertures and inter-aperture structural strips are vertically misaligned. Further, this packing may include a plurality of first packing elements having a void ratio in the range of about 0.4 to 0.7, and a plurality of second packing elements having a higher void ratio than that of the first packing elements, in the range 0.65 to 0.95.

The invention extends further to an evaporative cooler which includes a packing according to the invention.

Many conventional evaporative coolers with counterflow configurations for cooling a liquid such as water using a gas such as air as a coolant, include a packing which is located above a zone to which the gas has access via openings in a side wall of the cooler. When the cooler is in use, gas flows substantially horizontally through the openings and into the zone and is then drawn substantially vertically upwardly through the packing in counter-flow to liquid passing downwardly through the packing.

In a counter-flow configuration, the void ratio of the packing elements is particularly important. Each element should provide sufficient voids to accommodate both upward flow of gas and downward flow of liquid against the pressure of the gas, while at the same time providing sufficient surface area for the liquid to flow across or onto which the liquid can splash. Thus an optimum void ratio exists for particular liquids and gases.

In a cross-flow configuration, the optimum void ratio generally differs from that for a counter-flow configuration and is not as important. The surface area proportion of the packing elements can be relatively greater since the voids are only for permitting liquid to pass through the elements and no longer have to provide in addition for passage or upward pressure of gas.

According to the invention there is further provided a method of packing an evaporative cooler which has a first zone and, beneath the first zone, a second zone which has a first region into which, in use, gas is drawn in a substantially horizontal direction and a second region contiguous with the first region and from which, in use, the gas flows substantially vertically upwardly into the first zone, which method includes locating first packing elements having a void ratio in the range of about 0.4 to 0.7, in the first region of the second zone and locating second packing elements having a higher void ratio than that of the first packing elements, in the range 0.65 to 0.95, in the second region of the second zone, thereby providing a packing in the second zone which is adapted for cross-flow conditions in the first region and for counter-flow conditions in the second region.

The evaporative cooler may be a wet cooling tower which includes a shell wall with a base portion that circumscribes a base zone and that is provided with circumferentially spaced apertures to provide access for air to the base zone, and the method may include locating the first packing elements in a peripheral region of the base zone adjacent the apertures and locating the second packing elements towards the centre region of the base zone.

The invention includes a splash pack for a wet cooling tower, which includes layers of substantially horizontally disposed packing elements according to the invention, with the layers spaced a substantial distance apart from one another and with the elements in each layer positioned so as to provide overlapping regions in which a portion of one of the elements overlaps a portion of another, the elements in each layer being connected to one another by means of elongate connecting elements threaded through aligned or partially aligned apertures in the overlapping regions, and the layers being supported by means of substantially vertically disposed, elongate support elements which engage the connecting elements of adjacent layers of the packing elements.

The invention extends further to an evaporative cooler which includes a first zone and, beneath the first zone, a second zone which includes a first region adjacent a gas inlet through which, in use, the gas flows in a substantially horizontal direction and a second region contiguous with the first region for receiving the gas from the first region and, from which, in use, the gas flows substantially vertically upwardly, and the cooler includes first packing elements having a void ratio in the range of about 0.4 to 0.7, located in the first region, and second packing elements having a higher void ratio than that of the first packing elements, in the range 0.65 to 0.95, located in the second region.

According to the invention there is yet further provided a method of supporting apertured packing elements of a splash pack according to the invention in a wet cooling tower, which includes: forming a first layer of substantially horizontally disposed packing elements by positioning them so as to provide overlapping regions which are substantially co-planar with the remainder of the elements in the layer and in which a portion of each of the packing elements overlaps a portion of another; connecting the packing elements together by threading elongate connecting elements through aligned or partially aligned apertures of the packing elements in the overlapping regions; supporting the first layer of packing elements by means of substantially vertically disclosed, elongate, first support elements having respective first ends which engage the connecting elements; suspending from the first layer a second layer similar to the first layer and spaced a substantial distance from the first layer, by engaging the respective ends of the first support elements with respective second ends of second support elements similar to the first support elements; and engaging the respective first ends of the second support elements with the connecting elements of the second layer.

According to the invention there is yet further provided a method of supporting apertured packing elements of a packing in an evaporative cooler, which includes positioning two apertured packing elements so as to provide an overlapping region in which a portion of one of the elements overlaps a portion of the other;

connecting the elements together in the overlapping region by means of a connecting element; and supporting the elements by means of a vertically disposed elongate support element engageable with the connecting element.

The method may include locating the packing elements in vertically spaced layers, each of which comprises a plurality of the partially overlapping packing elements interconnected by means of the connecting elements.

Locating the packing elements in layers may include suspending a second layer from a similar, first layer located above the second layer by engaging respective first ends of first support elements by which the first layer is supported, with respective second ends of second support elements; and engaging the respective first ends of the second elements with the connecting elements of the second layer.

The method may include supporting at least one of the layers of packing elements from a fixed support member. Then the method may include fastening support elements to the support member such that they project substantially vertically downwardly from the support member and below the layer supported thereby.

The or each connecting element may be a wire element, and the method may include connecting together partially overlapping packing elements by threading the wire element through aligned or partially aligned apertures of the packing elements in the overlapping region.

The or each support element may be a wire element. A portion at at least one end thereof may be bent over to form a hook engageable with the connecting element and/or with another support element. Then the method may include further bending the end of the hook after engagement thereby with another support member and/or with a connecting element to form a closed loop around the other support member and/or the connecting element.

The invention extends to a packing in an evaporative cooler which includes two apertured packing elements positioned so as to provide an overlapping region in which a portion of one of the elements overlaps a portion of the other; and connected together in the overlapping region by means of a connecting element.

The packing may be supported by means of vertically disposed, elongated support elements.

The packing elements may be arranged in vertically spaced layers, each layer comprising a plurality of partially overlapping packing elements interconnected by means of the connecting elements.

A second layer of the packing may be suspended from a similar, first layer by means of second support elements, the respective second ends of which are engaged with the respective first ends of first support elements by which the first layer is supported, and the respective first ends of which are engaged with the connecting elements of the second layer.

At least one of the layers of packing elements may be supported from a fixed support member.

The layer adjacent and below the layer supported on or from the fixed support member may be suspended from support elements fastened to the fixed support member.

The invention extends even further to an evaporative cooler, and in particular to a wet cooling tower which includes a packing according to the invention.

The invention is now described by way of example, with reference to the accompanying drawings in which, FIGS. 1 to 8 show portions of first, second, third, fourth, fifth, sixth and seventh and eighth embodiments respectively of packing elements according to the invention for use in a wet cooling tower;

Figure 13:
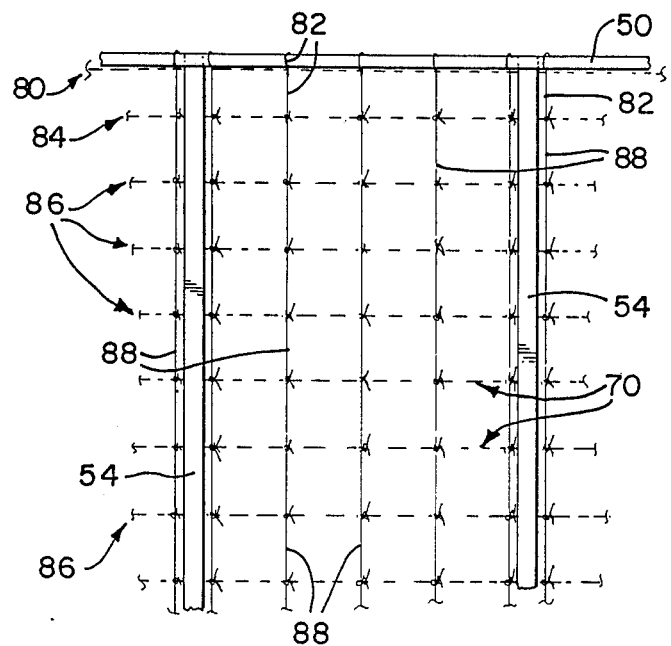
FIG. 13 is part of a vertical section through the cooling tower of FIG. 9, in which the packing elements are schematically portrayed, and which shows both horizontally and vertically disposed support members.

FIG. 14 is a vertical section through an overlapping region of two of the packing elements of the packing shown in FIG. 13, showing the respective end portions of two inter-connected support elements and the two connecting elements which they engage; and FIG. 15 is a plan view of a further embodiment of a packing element according to the invention as well as of portions of eight other, similar packing elements which are connected to one another.

FIG. 16 is a three-dimensional view of a packing with a trickle pack configuration; and FIG. 17 is a horizontal section through the trickle pack of FIG. 16.

Figure 1:
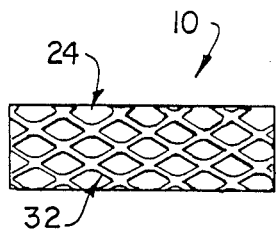
Figure 2:
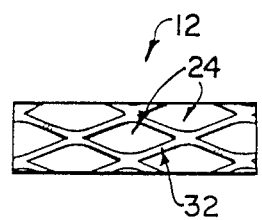
Figure 3:
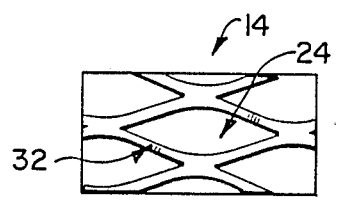
Figure 4:
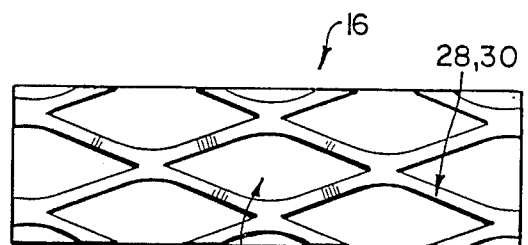
Figure 5:
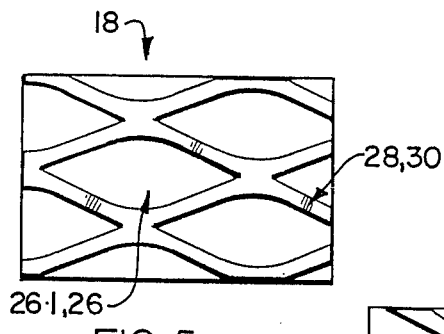
Figure 6:
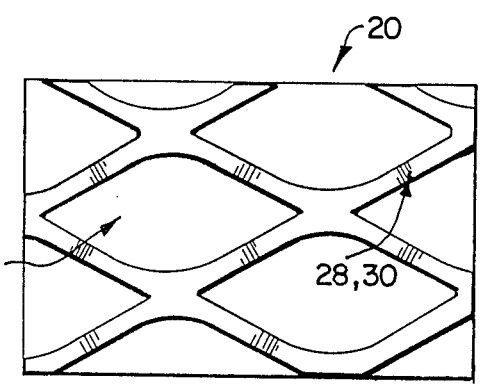
Figure 7:
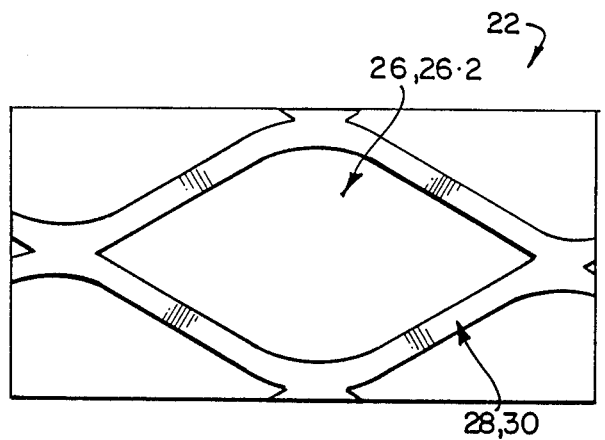
Figure 8:
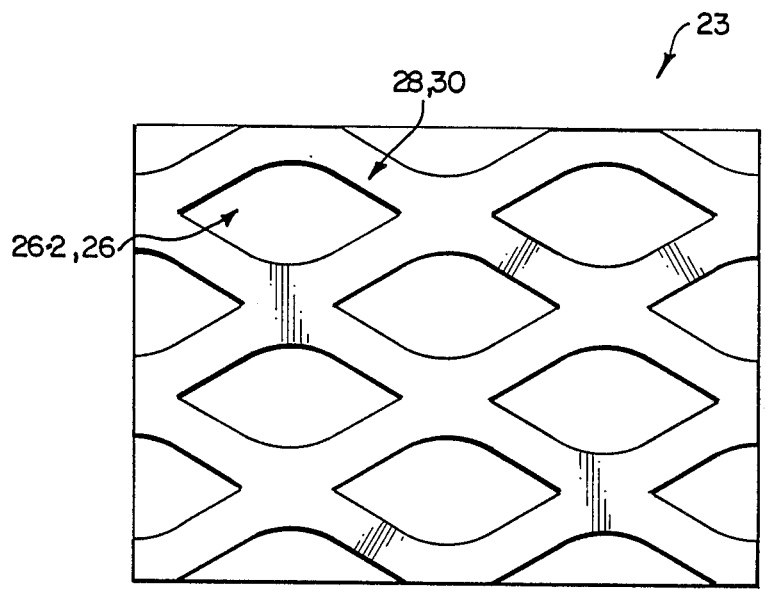

In FIGS. 1 to 3, reference numerals 10, 12 and 14 generally indicate portions of first, second, and third embodiments respectively of a packing element according to the invention for use in a trickle pack.

In FIGS. 4 to 8, reference numerals 16, 18, 20, 22 and 23 generally indicate portions of fourth, fifth, sixth, seventh and eighth embodiments respectively of a packing element according to the invention for use in a splash pack.

Each of the elements 10 to 23 is an expanded metal sheet of 3Cr12 and the portions thereof shown in the drawings are drawn to a scale of 1:1.

The elements 10, 12 and 14 which are intended for use in a trickle pack can clearly be seen to have smaller apertures 24 than those 26 of the elements 16 to 23 which are intended for use in a splash pack. Further, the elements 16 and 18 which have smaller apertures 26.1 than those 26.2 of the elements 20 and 22, are intended for use with relatively clean water, whereas the elements 20 and 22 are better suited for use with relatively dirty water. Yet further, the elements 16 to 22 which clearly have a higher void ratio than the element 23, are intended for use in a packing under counter-flow conditions, whereas the element 23 is better suited for use in a packing under cross-flow conditions.

The packing elements 16 to 23 have wide inter-aperture strips 28 relative to the elements 10 to 14. The strips 28 define impact surfaces 30. The packing elements 10 to 14 have narrower strips 32 which define flow paths for the water passing down the cooling tower.

Figure 9:
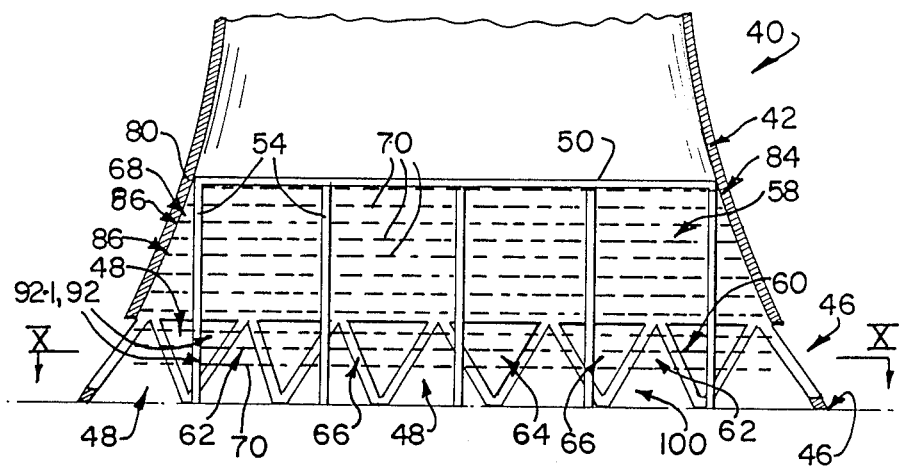
FIG. 9 is a vertical section through a natural draught wet cooling tower which schematically portrays packing elements according to the invention which have been supported in vertically spaced layers in accordance with the method of the invention to provide a packing according to the invention.
Figure 10:
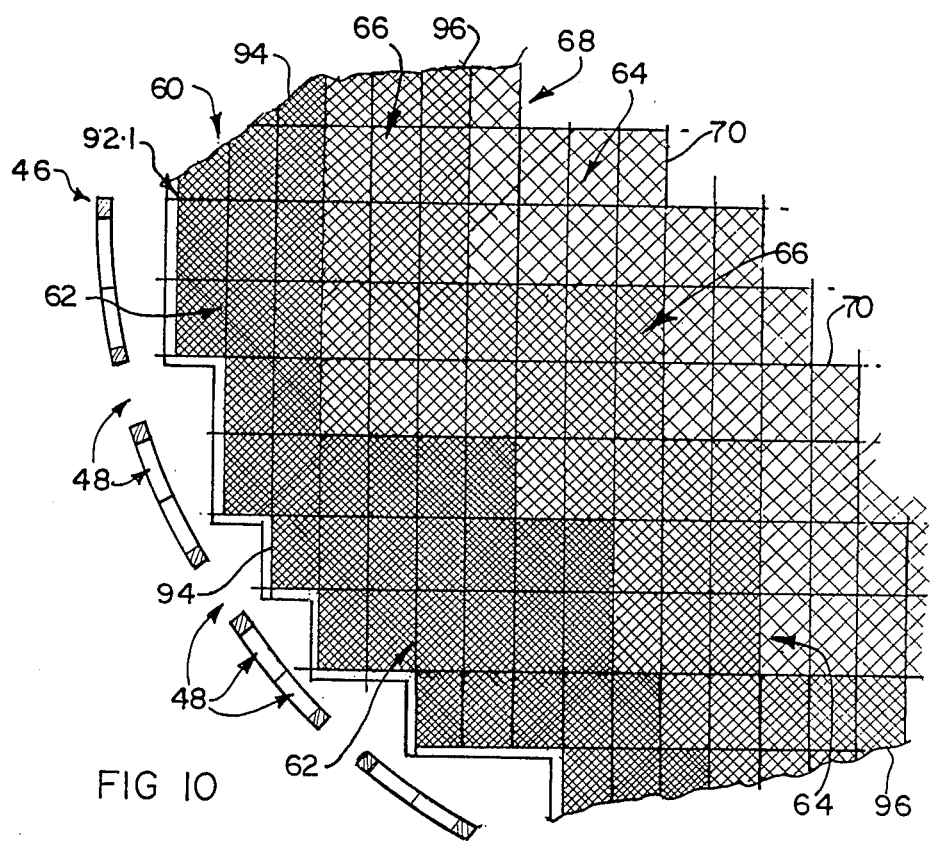
FIG. 10 is a horizontal section through the cooling tower showing a part of only one of the layers of the packing of FIG. 8, located in a base zone of the cooling tower.
Figure 11:
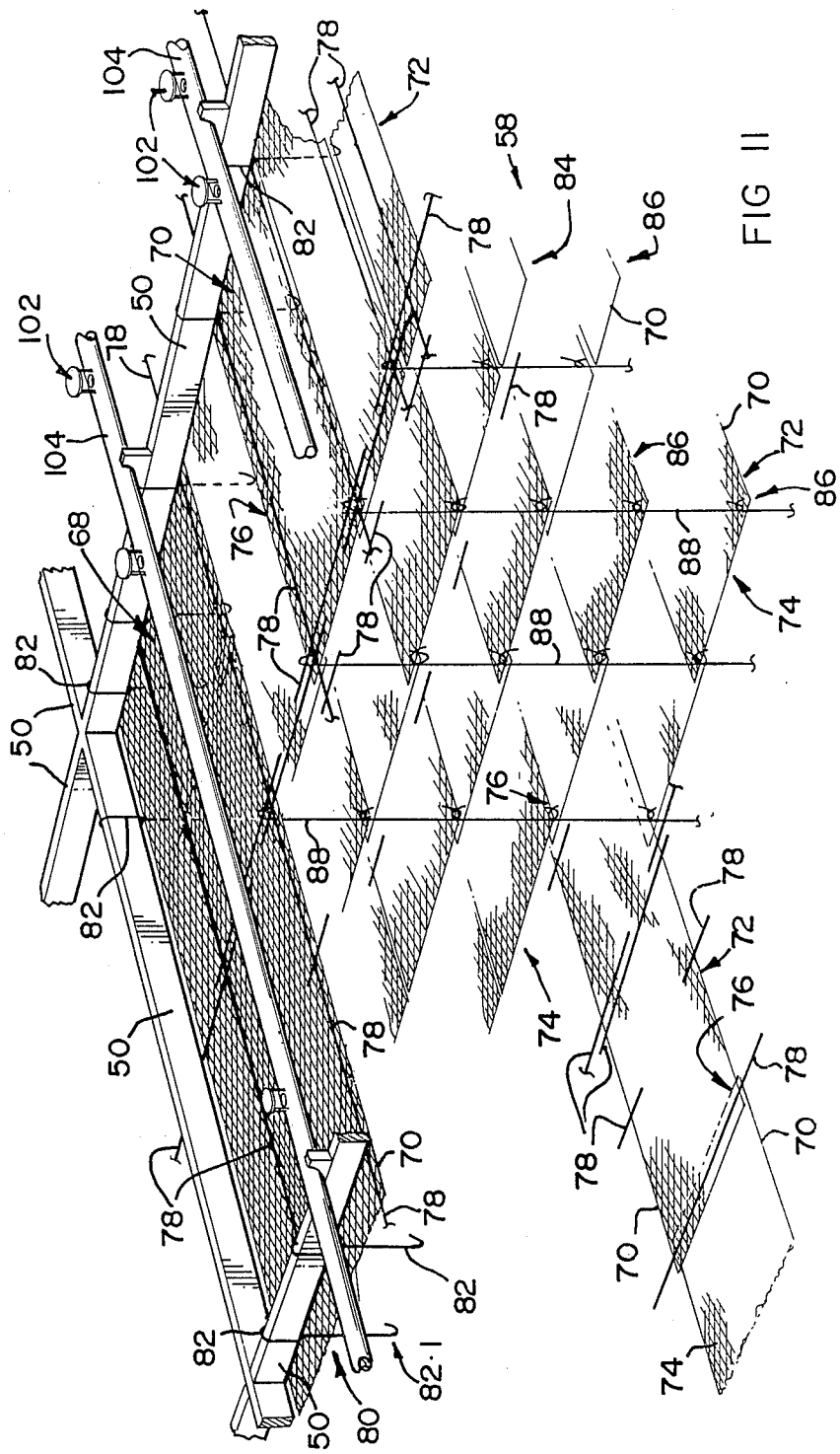
FIG. 11 is a three-dimensional view of part of the packing of FIG. 8 showing horizontally disposed fixed support members as well as connecting elements and support elements by which the packing is supported in the cooling tower.

In use, a plurality of the trickle pack elements 10, 12 or 14 occupy horizontally spaced, vertical planes within a cooling tower, as shown in FIG. 16, whereas a plurality of the splash pack elements 16 to 23 occupy vertically spaced, horizontal planes within a cooling tower, as shown in FIGS. 9 and 11, and are staggered with respect to one another so that their apertures 26 are vertically misaligned. The water hitting the upper flat impact surfaces 30 of the packing elements 16 to 23 breaks into smaller droplets and thereby increases the surface area of the water available to the air coolant.

In use the packing elements can be located within a cooling tower by conventional techniques. They can, however, be supported in a cooling tower in accordance with a method of the invention which is described below.

FIG. 9 shows a vertical section through a lower portion of a natural draught, wet cooling tower 40 which has a shell wall 42 standing on a support surface 44. The shell wall 42 has a base portion 46 with a lattice structure to provide inlet openings 48 for the passage of air into the tower 40. When the cooling tower 40 is in use, air is drawn in a substantially horizontal direction through the openings 48. The lower portion of the cooling tower 40 is provided, within its shell wall 42, with an arrangement of horizontally disposed support members in the form of pre-cast beams 50 which are, in turn, supported by pre-cast pillars 54.

The tower 40 has a first, upper zone 58 and a second, base zone 60 continuous with the upper zone 58. The base zone 60 comprises the space circumscribed by the base portion 46 of the shell wall, and the upper zone comprises the space circumscribed by the shell wall 42 and extending between the upper beams 50 and the base zone 60. The base zone 60 has three contiguous regions, namely a first or peripheral region 62 adjacent the base portion 46 of the latticed shell wall 42, a second, central region 64 at and adjacent the centre of the base zone 60, and an intermediate region 66 which is intermediate the first and second regions 62, 64.

The cooling tower 40 includes a splash pack 68 which has been supported in the cooling tower 40 by a method according to the invention which included the following procedure.

A plurality of rectangular packing elements 70 having two opposed surfaces bounded by two opposed long sides 72 and two opposed short sides 74, were positioned with respect to one another such that each partially overlapped the adjacent elements to provide overlapping regions 76.

The elements 70 were connected together in the overlapping regions 76 along both their long and short sides 72, 74 by threading connecting elements 78 in the form of lengths of wire (connecting wires) through aligned or partially aligned apertures, in directions substantially parallel to the long sides 72 and short sides 74 respectively, thereby to form a top layer 80 of the elements 70. Further connecting wires 78 were threaded through the elements intermediate their short sides 74.

The top layer 80 was supported within the cooling tower 40 from the upper beams 50 by tying the packing elements 70 to the beams 50 by means of first support elements 82 in the form of lengths of wire (support wires) which were looped around the beams 50 and were then positioned such that they projected substantially vertically downwardly below the top layer 80.

A first layer 84 of packing elements 70 was provided by positioning an appropriate number of the elements 70 with respect to one another such that each partially overlapped the adjacent elements to provide overlapping regions 76; connecting the elements 70 together in the overlapping regions 76 along their short sides 74 by means of connecting wires 78 threaded through aligned or partially aligned apertures in a direction substantially parallel to the respective short sides 74; and threading further connecting wires 78.1 through the apertures of adjacent elements and across the overlapping regions 76 thereof, also in a direction substantially parallel to their long sides 74. The first layer 84 was supported beneath the top layer 80 by engaging the respective free, first ends 82.1 of the first support wires 82 with the connecting wires 78 for the first layer 84.

A second layer 86 of packing elements 70 was provided in the manner described above and was suspended from the first layer 84 by engaging the respective first ends 82.1 of the first support wires 82 as well as the connecting wires 78.1 engaged thereby, with the respective second ends 88.2 of second support wires 88, and by then engaging the connecting wires 78.2 of the second layer 86 with the respective first ends 88.1 of the second support wires 88.

Several further layers 86 were installed in the upper zone 58 of the cooling tower 40 in the manner described above for the second layer 86.

Several layers 92 of packing elements 70, 94 and 96 were then provided and installed in the base zone 60 of the cooling tower 40 in a similar manner as described above for the second layer.

Figure 12:
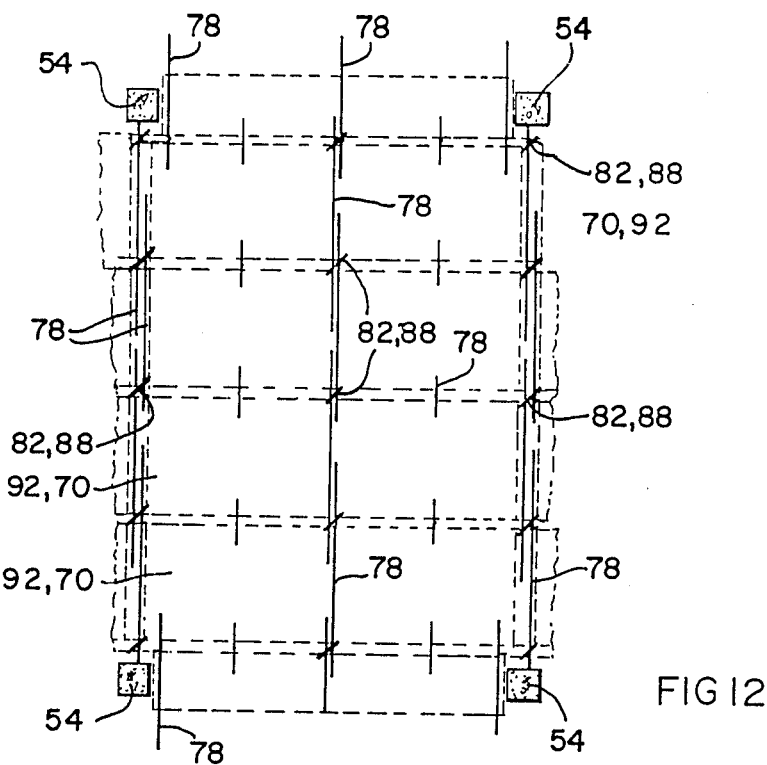
FIG. 12 is a plan view of several of the packing elements which are arranged in an overlapping configuration, and shows the connecting elements and regions of engagement thereof by support elements in more detail.

As can clearly be seen from FIG. 12, a single connecting wire 78 may not be sufficiently long to extend across the width or length of a packing element 70, 94 or 96. Instead, an appropriate number of the connecting wires 78 may be required to span the width or length with adjacent connecting wires 78 lying parallel and close to one another and with their respective end portions overlapping each other.

As can also be seen clearly from FIG. 12 and even more clearly from FIG. 14, the support wires 82 of the top layer and the respective wires 88 of the first and further layers 84, 86 engage the connecting wires 78 in regions in which the end portions of two adjacent connecting wires 78 overlap each other.

The support wires 88 used for the first and subsequent layers 84, 86 suspended within the upper zone 58 of the tower 40, and for the layers 92 suspended within the base zone 60, have a portion at each end thereof which is bent to form a hook 98 for engaging other support wires 82 or 86 and adjacent pairs of connecting wires 78. The support wires 82 used for the top layer 80 have the hook formation 98 at only one end 82.1 (the first end) thereof, the other, second end portion 82.2 being adapted to facilitate its being looped around and tied onto one of the beams 50.

The bottom layer 92.1 of packing elements 70, 94 and 96 in the base zone is vertically spaced from the support surface 44 for the cooling tower 40, the region 100 below this bottom layer 92.1 being what is commonly known as the "rain zone" of the tower 40.

Each of the layers 92 in the base zone 60 comprises packing elements 94 with a void ratio in the range 0.5 to 0.6 in the first, peripheral region 62 thereof; packing elements 70 which have a void ratio range 0.75 to 0.85 in the central region 64 thereof; and packing elements 96 with a void ratio intermediate those of the peripheral and central regions 62, 64 in the intermediate region 66.

Depending on the degree of purity of the water for which the cooling tower 40 is intended for use, the packing elements 94 in the peripheral region 62 will have apertures with width and length dimensions from about 10 mm to 30 mm respectively, to about 40 mm to 80 mm respectively, and inter-aperture strips 28 with a width dimension between 5 mm and 10 mm (see FIG. 8); and the packing elements in the central region 64 will have apertures with width and length dimensions greater than those of the elements 94, with a maximum of about 60 mm and 120 mm respectively, and inter-aperture strips 28 with a width dimension smaller than that of the elements 94 and between 3 mm and 6 mm (see FIGS. 4 to 7).

When the cooling tower 40 is in use, hot water (not shown) sprays from nozzles 102 in hot water supply pipes 104 fastened to the upper beams 50. Air is drawn in a substantially horizontal direction into the peripheral region 62 of the base zone 60 via the inlet openings 48 provided by the latticed, base portion 46 of the shell wall 42, thereby creating cross-flow conditions. It will be appreciated that the packing 68 in this peripheral region 67 is appropriately configured for cross-flow conditions, comprising packing elements 94 with a relatively low void ratio and relatively small aperture size. Meanwhile, air is being drawn upwardly into the upper zone 58. Under this influence, as the air flows inwardly towards the centre of the tower 40, it changes direction until, in the central region 64 of the base zone 60, it is flowing substantially vertically upwardly, thereby creating counter-flow conditions. It will be appreciated that the packing 68 in the central region 64 is appropriately configured for counter-flow conditions since it comprises packing elements 70 with a relatively high void ratio and relatively large aperture size. The intermediate region 66 is appropriately configured for mixed flow conditions, comprising packing elements 96 with a void ratio sufficient to allow the simultaneous passage of water and only a limited amount of air through the elements 96.

FIG. 16 shows a vertical section through a three-dimensional view of a further embodiment of a packing according to the invention. The packing is indicated generally by reference numeral 110, and includes vertically disposed, horizontally spaced packing elements 112 selected from the elements 10 to 14 of FIGS. 1 to 3. The packing 110 constitutes a trickle pack and is shown supported on pre-cast support beams 116 (only portions of which are shown in FIG. 16) which are within a wet cooling tower (not shown). The elements 110 are connected together by means of horizontally spaced pairs of vertically spaced PVC connecting tubes 118 which extend through aligned apertures 120 of the elements 110. The elements 110 are held apart by means of short lengths of tubular PVC sleeves 122 which are located around the connecting tubes 118 between the elements 110.

FIG. 15 shows a further embodiment of a packing element according to the invention which is indicated generally by reference numeral 130. The element 130 is intended for use in a splash pack for a wet cooling tower (not shown) under either cross-flow or counter-flow conditions and can have a configuration similar to any of the elements 16 to 23 of FIGS. 1 to 8. The element 130 is square but can be rectangular instead, and can be supported in a cooling tower by way of the following method.

A plurality of the elements 130 are positioned side by side in aligned rows 134 (i.e. 134.1 to 134.3) and columns 136 (i.e. 136.1 to 136.3) as shown in FIG. 15.

Connecting wires 132 similar to the second support wires 88 described above with reference to FIGS. 9 to 14, are used to connect a plurality of elements 130 together to form a layer thereof. The elements 130 are connected as follows.

Each corner of a first packing element 130.1 in the row 134.2 is connected to the corner of the adjacent element 130.2 which is in the adjacent row 134.1 or 134.3 but which is not aligned with the element 130.1, by appropriately hooking the ends 138.1 and 138.2 respectively of the connecting wire 132 around selected inter-aperture structural strips 140 of the elements 130.1 and 130.2 respectively.

The corners of an appropriate number of other packing elements 130 are inter-connected in similar manner to form a layer of the elements 130. This can be supported in the cooling tower by means of support wires 82 and/or 88 which are described above.

Where the tower is provided with fixed support beams as is the tower 40 described above, the top layer of packing elements 130 is supported from the beams by fastening respective second ends 82.2 of support wires 82 to the beams and positioning them to project downwardly below the beams. A first layer of the elements 130 is then installed in the cooling tower by engaging the connecting wires 132 of the first layer in the regions of intersection of the wires 132, with the first ends 82.1 of the support wires 82. A second and subsequent layers are installed thereafter, in turn, by engaging the first ends 82.1 or 88.1 of the first or second support wires 82, 88 respectively with the respective second ends 88.2 of second support wires 88, and engaging the connecting wires 132 in the second or subsequent layers, in the regions of intersection of the wires 132, with the respective first ends 88.1 of the second support wires 88.

Instead, the packing elements 130 may be connected indirectly to one another by connecting each element 130 to a support wire 82 or 88. Thus, for example, where an appropriate number of appropriately spaced support wires 82 or 88 are hanging from a fixed support member or from a layer already supported within a cooling tower and their respective first ends 82.1 or 88.1 are free, then a further layer can be provided by engaging an inter-aperture structural strip 140 in each corner region of each element 130 with an end 138.1 of a connecting wire 132, and engaging the free end 82.1 or 88.1 of a support wire 82 or 88 with the other end 138.2 of the connecting wire 132.

Advantages of the packing elements and methods of the invention, at least as exemplified, include their simplicity, ease of use and efficacy. Where the packing element is of expanded metal, a wide variety of configurations is obtainable merely by varying, during manufacture thereof, the length of cut, the inner-cut width, and the extent and manner of stretching the metal sheet. A further advantage is the relative inexpensiveness of the element because of low labour costs involved in manufacturing the packing element and the relatively inexpensive cost of the metal used (as compared to plastics for example). Whereas packing elements according to the invention can be made from any one of a variety of sheet thicknesses, the applicant is of the opinion that a sheet of from 1 mm to 1.2 mm thickness would provide an eminently suitable packing element at relatively low cost. Furthermore, packing elements according to the invention made from 3Cr12 or stainless steel or the like are extremely strong and accordingly are less susceptible to mechanical damage, to ageing, and to brittleness as are other materials such as plastics.

Yet further, the relative ease with which the void ratio and aperture size of an expanded metal packing element according to the invention can be varied, makes economically feasible the inclusion, in a single evaporative cooler, of first packing elements and second packing elements having void ratios and/or aperture sizes different to those of the first packing elements. Thereby more efficient coolers can be economically produced.

I claim:

1. A packing element for a splash pack for an evaporative cooler, which element comprises a sheet of expanded metal which is corrosion resistant and which has a flat splash surface and apertures with width and length dimensions of from approximately 10 mm and 30 mm respectively to approximately 60 mm and 120 mm respectively.

2. A packing element as claimed in claim 1, which is of 3Cr12.

3. A splash pack for a wet cooling tower, which includes layers of substantially horizontally disposed packing elements as claimed in claim 1, with the layers spaced apart a distance of from 200 mm to 1000 mm and with the elements in each layer positioned so as to provide overlapping regions in which a portion of one of the elements overlaps a portion of another, the elements in each layer being connected to one another by means of elongate connecting elements threaded through aligned or partially aligned apertures in the overlapping regions, and the layers being supported by means of substantially vertically disposed, elongate support elements which engage the connecting elements of adjacent layers of the packing elements.

4. A splash pack for an evaporative cooler which includes a plurality of horizontally disposed packing elements as claimed in claim 1, which elements are vertically spaced a substantial distance from each other.

5. A splash pack as claimed in claim 4 for an evaporative cooler having a first zone and, beneath the first zone, a second zone which includes a first region adjacent a gas inlet through which, in use, the gas flows in a substantially horizontal direction and a second region contiguous with the first region for receiving the gas from the first region and, from which, in use, the gas flows substantially vertically upwardly, and the splash pack includes first packing elements having a void ratio in the range of about 0.4 to 0.7, located in the first region and second packing elements having a higher void ratio than that of the first packing elements, in the range 0.65 to 0.95, located in the second region.

6. An evaporative cooler which includes a splash pack as claimed in claim 4.

7. A method of supporting apertured horizontally disposed packing elements of a splash pack for an evaporative cooler, with the packing element including a sheet of expanded metal which is corrosion resistant and which has a flat splash surface and apertures with width and length dimensions of from approximately 10 mm and 30 mm respectively to approximately 60 mm and 120 mm respectively, and with the elements being vertically spaced a substantial distance from each other, said method including forming a first layer of substantially horizontal disposed packing elements by positioning them so as to provide overlapping regions which are substantially co-planar with the remainder of the elements in the layer and in which a portion of one of the packing elements overlaps a portion of another;

connecting the packing elements together by threading elongate connecting elements through aligned or partially aligned apertures of the packing elements in the overlapping regions;

supporting the first layer of packing elements by means of substantially vertically disposed, elongate, first support elements having respective first ends which engage the connecting elements;

suspending from the first layer a second layer similar to the first layer in a spaced-apart relationship from the first layer, by engaging the respective first ends of the first support elements with respective second ends of second support elements similar to the first support elements; and engaging the respective first ends of the second support elements with the connecting elements of the second layer.

* * * * *

UNITED STATES PATENT AND TRADEMARK OFFICE
CERTIFICATE OF CORRECTION

PATENT NO. : 4,762,650

DATED : August 9, 1988

INVENTOR(S) : Peter B. Bosman

It is certified that error appears in the above-identified patent and that said Letters Patent is hereby corrected as shown below:

Column 8, Line 57     insert --over-- after "bent"

Signed and Sealed this

Twenty-first Day of February, 1989

Attest:

DONALD J. QUIGG

*Attesting Officer*     *Commissioner of Patents and Trademarks*